United States Patent [19]

Bash

[11] 4,002,032
[45] Jan. 11, 1977

[54] SOLAR HEATED DEVICE

[76] Inventor: D'Arle G. Bash, 10345 SW. 117th St., Miami, Fla. 33176

[22] Filed: Nov. 28, 1975

[21] Appl. No.: 636,158

[52] U.S. Cl. .................................. 60/641; 60/669; 60/674; 126/271
[51] Int. Cl.² .......................................... F03G 7/02
[58] Field of Search .................... 60/641, 669, 674; 126/270, 271

[56] References Cited

UNITED STATES PATENTS

| 726,770 | 4/1903 | Siple | 60/674 |
| 1,016,210 | 1/1912 | Christie | 60/674 |
| 1,683,266 | 9/1928 | Shipman | 126/271 |
| 2,872,915 | 2/1959 | Bowen | 60/641 |
| 3,879,950 | 4/1975 | Yamada | 60/674 |

FOREIGN PATENTS OR APPLICATIONS

| 862,843 | 1/1940 | France | 60/641 |
| 1,122,344 | 9/1956 | France | 60/641 |

*Primary Examiner*—Allen M. Ostrager
*Attorney, Agent, or Firm*—Oltman and Flynn

[57] ABSTRACT

A solar heated device including a conduit for expansion and flow of gases, and a solar light collector for heating the gas in the conduit, is provided with a gas turbine that is driven by the gas as it expands as a result of the solar heating. The conduit may include an inlet for introducing air, or an inlet for introducing water spray (later steam), or both, thus supplying the gas which is heated and expanded in the conduit to drive the gas turbine. The light collector is preferably a parabolic reflector that directs sunlight on the conduit in order to heat and expand the gas therein. The turbine ordinarily drives an electric generator.

14 Claims, 7 Drawing Figures

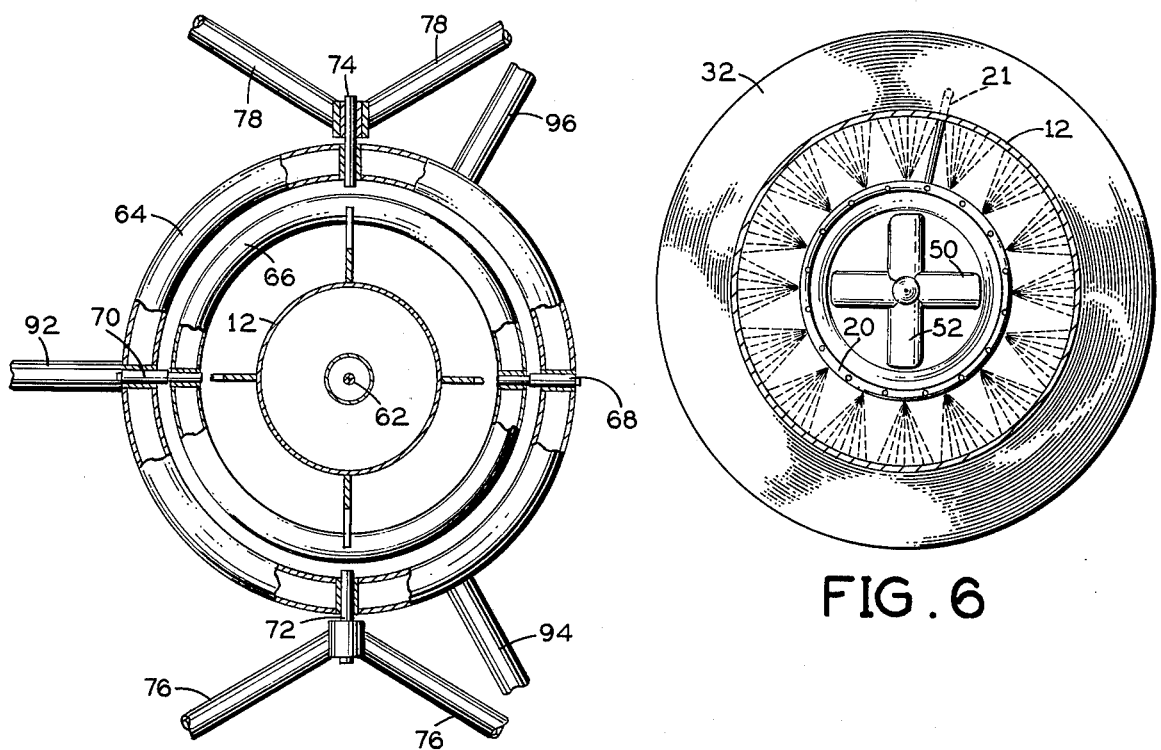
FIG. 5
FIG. 6
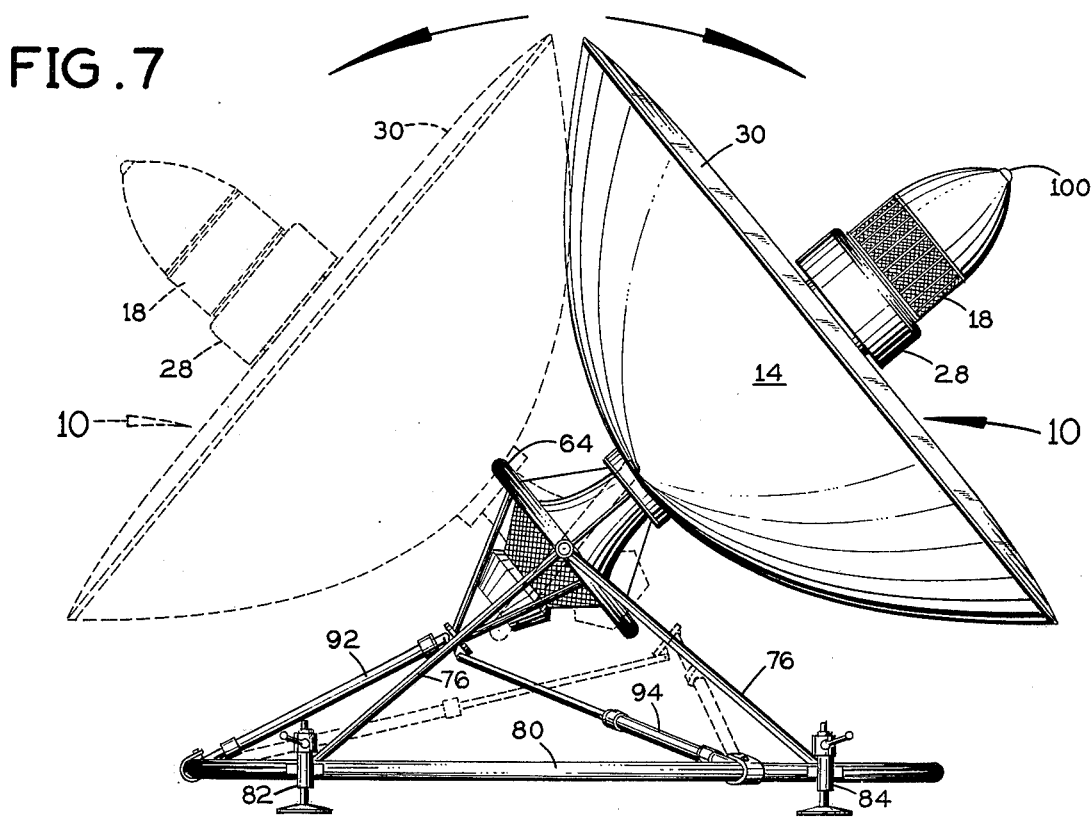
FIG. 7

SOLAR HEATED DEVICE

BACKGROUND OF THE INVENTION

Solar heated devices in which gas is heated and expanded by sunlight have been proposed previously; for example, in U.S. Pat. No. 3,436,908—VanDelic. Other background solar devices are described in U.S. Pat. Nos. 1,814,897—Coxe and 3,490,996—Kelly. There is a need for improvement of such solar devices, especially in view of present shortages of economical fuels for electric power generating systems.

SUMMARY OF THE INVENTION

In the solar heated device of this invention, gas which is expanded in a conduit by heat derived from sunlight drives a gas turbine. The turbine ordinarily drives an electric generator which may supply electric power for general or special purpose consumption. The sunlight is preferably collected by a parabolic reflector which directs light on the conduit to heat the gas therein. The gas may be air, or steam, or a mixture.

Accordingly, it is an object of the present invention to provide an improved solar heated device which heats and expands gas by sunlight to provide mechanical power.

Another object of the invention is to drive a gas turbine with the expanding gas, thus providing an efficient way to convert the solar energy to mechanical power.

A further object of the invention is to utilize the mechanical power from the turbine to drive an electric generator, thus supplying electrical energy.

Among other objects of the invention are to (1) utilize air and/or steam as the gaseous material, (2) heat the gas with sunlight supplied from a parabolic reflector, (3) enable the device to move so that it can track the sun, and (4) make efficient use of the energy of the device by feeding back energy where possible.

Other objects of this invention will appear from the following description and appended claims, reference being had to the accompanying drawings forming a part of this specification wherein like reference characters designate corresponding parts in the several views.

BRIEF DESCRIPTION OF DRAWINGS

FIG. 5 is a cross-sectional view taken along line 5—5 of FIG. 1;

FIG. 6 is a cross-sectional view taken along line 6—6 of FIG. 3; and

FIG. 7 is an elevational view showing the solar heated device in different positions.

Figure 1:
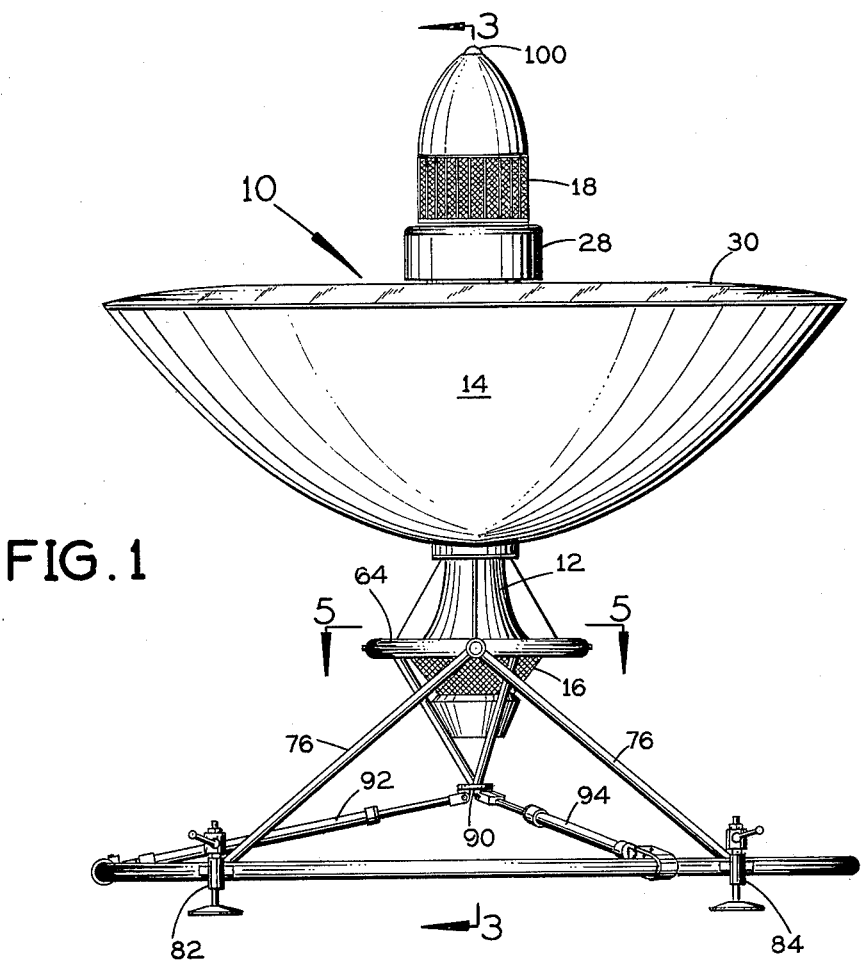
FIG. 1 is an elevation view of a preferred embodiment of the invention.
Figure 2:
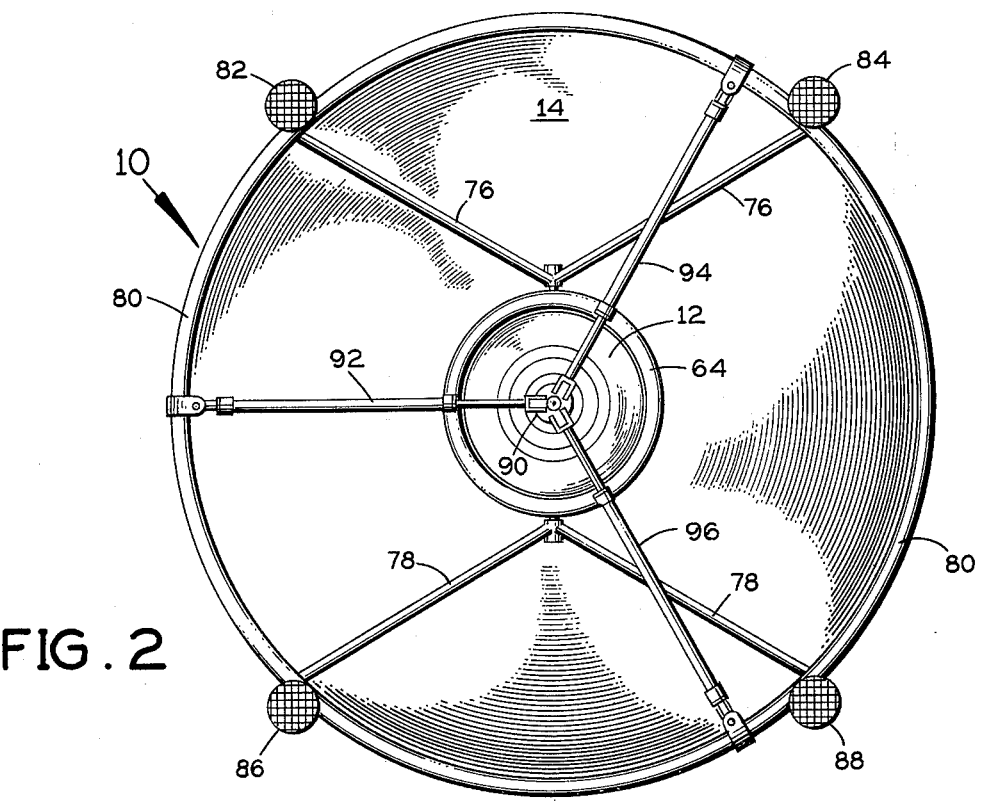
FIG. 2 is a bottom plan view thereof.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The solar heated device 10 includes a conduit 12 in which gas is permitted to flow and expand, and a solar light collector 14 for collecting light from the sun and causing the light to heat the gas in the conduit 12. The gas which is heated and expanded in the conduit 12 is either air, or steam or a mixture thereof.

When it is desired to heat air in the conduit 12, the conduit has an air inlet 16 for introducing air into the conduit, and an air outlet 18 through which air leaves the conduit. When it is desired to use steam as the gas in the conduit, a ring 20 is provided inside the conduit for spraying water into the conduit where it is heated and converted to steam by heat supplied from the light collector 14. Spent steam will escape from the conduit through the outlet 18. If only steam is to be heated in the conduit, the air inlet 16 may be omitted and the lower end of the conduit is sealed off. Where air alone is to be heated in the conduit, the water spraying ring 20 may be omitted. A mixture of steam and air may be used.

Figure 4:
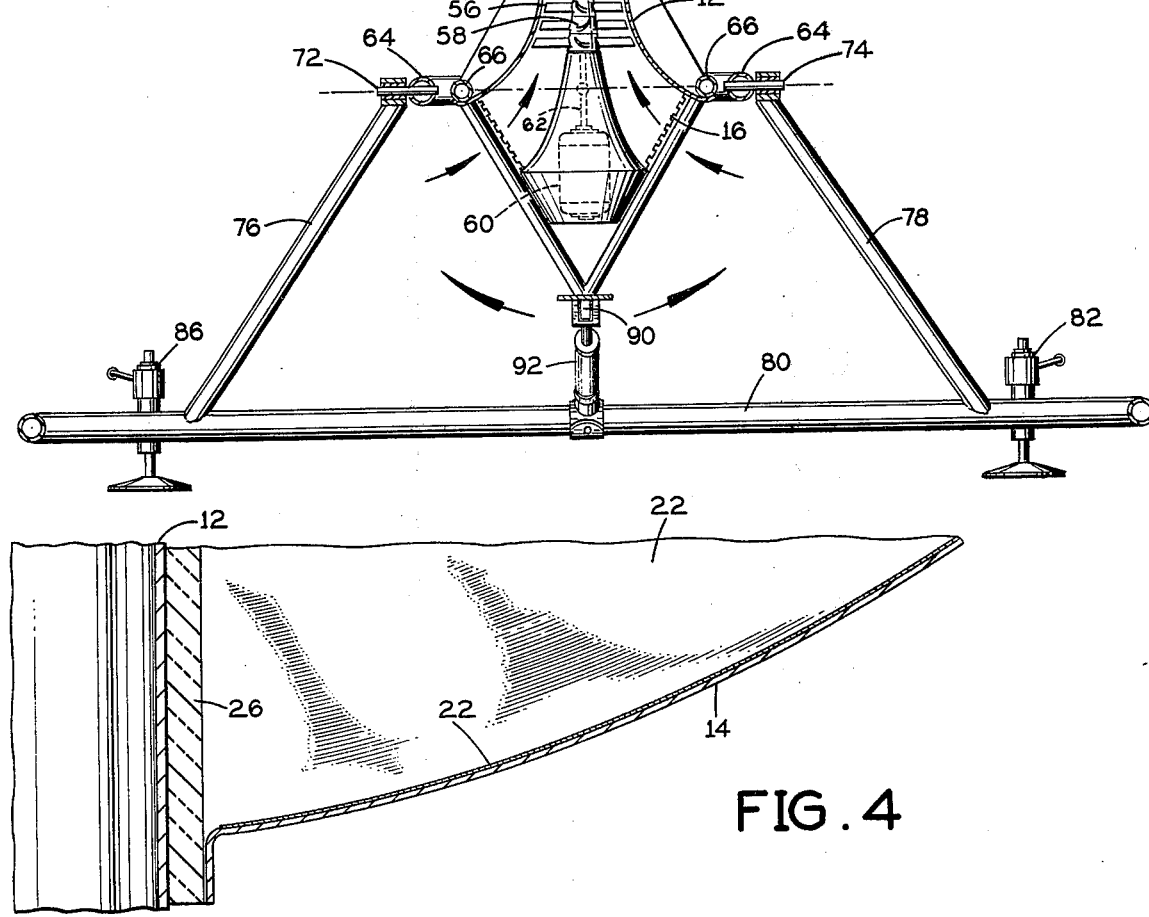
FIG. 4 is a fragmentary sectional view enlarged from FIG. 3.

The solar light collector 14 is preferably a parabolic light reflector. As shown in FIG. 4, the parabolic reflector 14 may be made of a layer of plastic material such as "mylar" metalized on the inside with a shiny material such as aluminum. Light impinging on the inner surface 22 of the reflector 14 is directed on an exposed expansion chamber 24 at the center of the conduit 12 so as to heat the conduit. This heat is transferred to the gaseous material flowing inside the conduit. The rest of the conduit, except for the inlet and outlet, may be insulated with thermal insulation material 26. The insulation material is omitted from the expansion chamber 24 and is also omitted at the upper end of the conduit where a heat exchanger 28 is located. This heat exchanger is in heat transfer relation with the conduit and is used when the water spraying ring 20 is in use. The water supplied to the ring 20 at inlet 21 (FIG. 6) first flows through the heat exchanger 28 where it derives heat from spent steam for the purpose of preheating the water supplied to the spraying ring 20.

Figure 3:
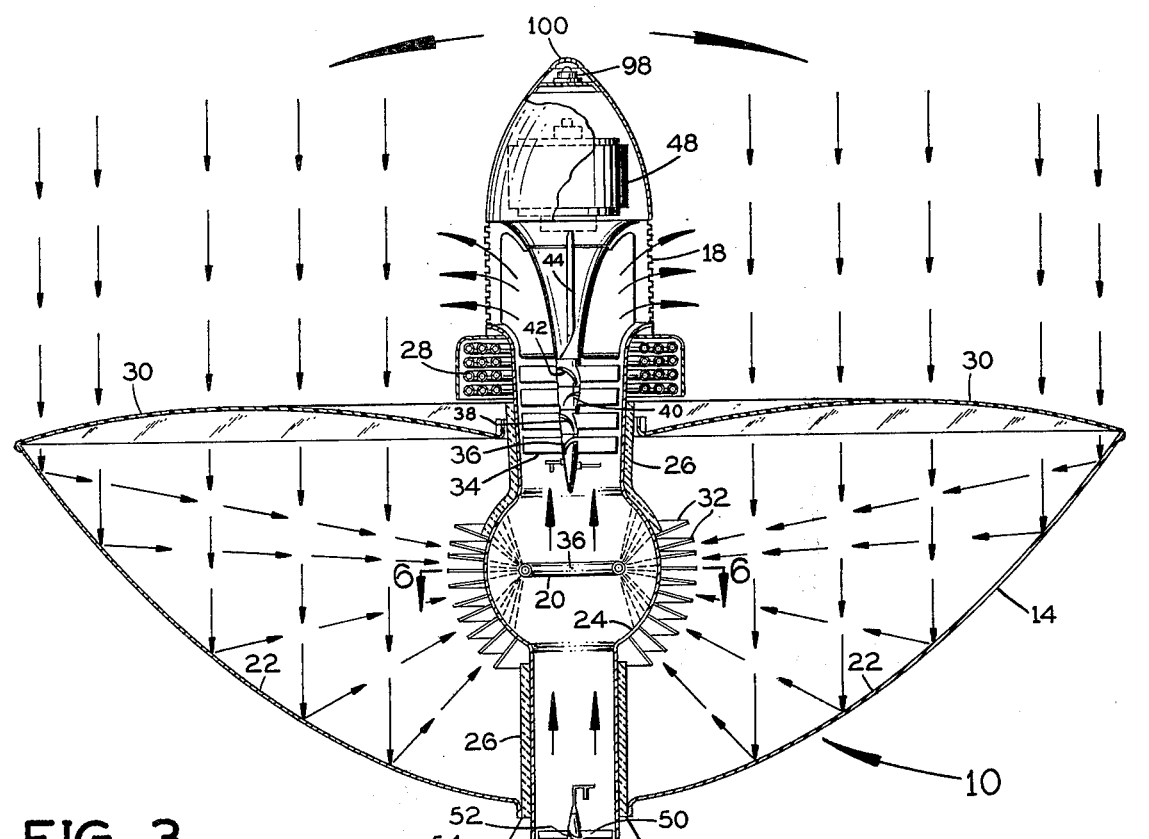
FIG. 3 is a vertical sectional view taken along line 3—3 of FIG. 1.

The parabolic reflector 14 may be covered with a transparent cover 30. Light shines through the cover 30 on to the reflective surface 22 as illustrated by arrows in FIG. 3. The parabolic reflector 14 has a focal point within the conduit 12, and specifically, within the expansion chamber 24. Thus, as indicated in FIG. 3, the light is directed from the reflective surface 22 on to the expansion chamber 24 for heating the expansion chamber and thus the gas therein.

When the reflector 14 and its cover 30 are made of plastic material such as described above, the reflector may be inflated with air so that it will retain its shape. However, it should be noted that the reflector may be made of other suitable materials and need not be inflated if these materials are provided with suitable reinforcement.

When the reflector 14 is covered as with the transparent cover 30, the air inside the reflector is heated by the greenhouse effect. Some of this heat may be transmitted to the inside of the expansion chamber 24 by providing heat exchanging fins 32 on the outside of the expansion chamber.

Inside the conduit 12, a gas power turbine 34 is located adjacent the focal point 36 of the parabolic reflector. The gas turbine 34 is driven by the expanding gas which flows upward in the direction of the arrows inside the conduit 12. The gas turbine 34 includes at least one stator 36 and at least one rotor 38. Preferably, it includes additional stators and rotors such as elements 40 and 42 respectively. The gas turbine 34 is an efficient way of converting the energy of the rising gas stream inside conduit 12 into mechanical energy.

The gas turbine 34 is connected by a shaft 44 to an electrical generator 48 at the top of the device 10. The electric generator 48 is driven by the turbine 34 and may be utilized to supply electrical power through normal power distribution lines.

Optionally, the device 10 may include a compressor turbine 50 including at least one stator 52 and one rotor 54. Preferably, the compressor turbine 50 includes additional stators and rotors such as the elements 56 and 58 respectively. The two turbines 34 and 50 may have a common shaft (not shown). The purpose of the compressor turbine 50 is to compress the air entering the conduit 12 through the inlet 16. When steam is being used as the only gas in the conduit, the compressor turbine 50 is omitted.

Another option is the electric motor 60 at the bottom of the device. This motor may be driven by electrical power supplied by the generator 48. It is connected by a shaft 62 to the compressor turbine 50, and thus it may supply some driving power to the compressor turbine. Motor 60 is provided with a speed control, and thus can be used for the purpose of controlling the speed of the compressor turbine 50.

The device 10 is mounted by means of gimbal rings 64 and 66. Ring 66 is attached to the lower end of the conduit 12. Ring 66 is pivotally connected to ring 64 by pins 68 and 70 shown in FIG. 5. Offset 90 degrees from pins 68 and 70, there are two pivotal connections 72 and 74 where the ring 64 is mounted on legs 76 and 78. The legs 76 and 78 extend down to a ring 80 which is mounted on leveling feet 82, 84, 86 and 88.

The bottom end 90 of the conduit 12 is connected by three piston and cylinder devices 92 and 94 and 96 to the ring 80. The piston and cylinder devices may be hydraulically operated or pneumatically operated in order to pivot the device 12 on the gimbal rings 64 and 66 between changed positions such as those illustrated in FIG. 7. The purpose of this pivotal movement is to enable the device 10 to track the sun so that the sunlight will always shine directly into the parabolic reflector 14 and be directed on the expansion chamber 24 throughout daylight hours.

Preferably, a photo-electric tracking device 98 is provided at the top end 100 of the conduit 12, and this tracking device 98 may be utilized to drive a hydraulic system (not shown) which will control the piston and cylinder devices 92, 94 and 96. The tracking device 98 senses when light is not shining directly into the parabolic reflector 14, and actuates the hydraulic system so as to move the device 12 until sunlight does shine directly into the reflector 14.

Thus, the invention provides a solar powered turbine for driving an electric generator or other equipment.

I claim:

1. In a solar heated device for expansion of gaseous material including:
   conduit means for containing gaseous material and for permitting expansion and flow of said gaseous material therein;
   and solar light collecting means in heat transfer relation with said conduit means for collecting light from the sun and causing the light to heat the gaseous material in said conduit means for expansion and flow of said gaseous material in said conduit means;
the improvement comprising
   turbine means including at least one stator and one rotor driven by said expanded flowing gaseous material for converting solar energy into mechanical energy;
   said solar light collecting means comprising a parabolic reflector means associated with said conduit means for directing light from the sun on to said conduit means to heat the same;
   said conduit means being in heat transfer relation with gaseous material therein;
   said parabolic reflector means having a focal point within said conduit means and encircling said conduit means; and
   said turbine means being located within said conduit means adjacent said focal point of said parabolic reflector means.

2. The solar heated device as claimed in claim 1 including further:
   water spraying means for spraying water into said conduit means to be converted to steam by the heat which steam expands to drive said turbine means.

3. The solar heated device as claimed in claim 1, including further:
   air inlet means for introducing air into said conduit means to be expanded by the heat from said reflector means to drive said turbine means.

4. The solar heated device as claimed in claim 3 including further:
   water spraying means for spraying water into said conduit means to be converted to steam by the heat from said reflector means to further drive said turbine means.

5. The solar heated device as claimed in claim 1 including:
   electrical generator means driven by said turbine means for supplying electrical energy.

6. The solar heated device as claimed in claim 5 including:
   compressor means associated with said turbine means for compressing fluid supplied thereto; and
   electrical motor means driven by said generator means coupled to said compressor means for driving the same.

7. The solar heated device as claimed in claim 1 including:
   gimbal means for supporting said conduit means;
   leg means for supporting said gimbal means; and
   piston-cylinder means connected to said conduit means for operating the same.

8. The solar heated device as claimed in claim 3 including further:
   compressor turbine means for compressing the air from said air inlet means before expansion in said conduit means.

9. The solar heated device as claimed in claim 2 including further:
   heat exchanger means affixed to said conduit means for deriving heat from the steam delivered from said turbine means;
   said heat exchanger means including a passage for the water sprayed into said conduit means and leading to said water spraying means for preheating said water before spraying thereof.

10. The solar heated device as claimd in claim 1 in which:
  said parabolic reflector means includes a light transmitting and heat insulating cover for admitting light to said reflector means and trapping heat therein.

11. The solar heated device as claimed in claim 1 in which:
  said turbine means includes stators and rotors in addition to said one stator and said one rotor.

12. The solar heated device as claimed in claim 11 including:
  electrical generator means driven by said turbine means for supplying electrical energy.

13. The solar heated device as claimed in claim 12 including:
  water spraying means for spraying water into said conduit means to be converted into steam by said heat for driving said turbine means.

14. The solar heated device as claimed in claim 1 in which:
  said parabolic reflector means includes a parabolic mirror surface and a transparent cover for said mirror surface for admitting sunlight thereto and for creating a greenhouse effect,
  said reflector means being flexible and having gas pressure therein maintaining the same in parabolic shape.

* * * * *